Oct. 25, 1938.                 C. HAYWOOD                2,134,188
HEATING AND COOLING SYSTEM FOR SELF PROPELLED VEHICLES
Original Filed Oct. 19, 1936
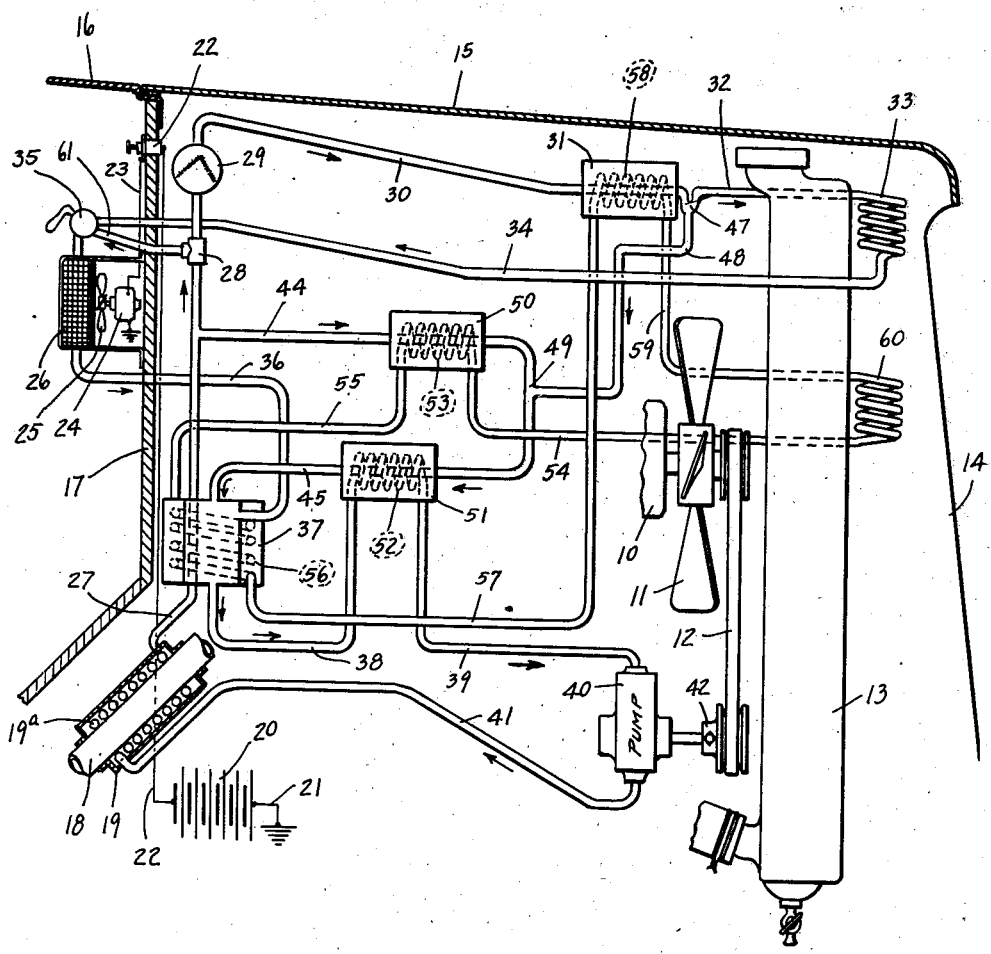
INVENTOR.
CARL HAYWOOD.
BY
*Lockwood Goldsmith & Halt*
ATTORNEYS.

Patented Oct. 25, 1938

2,134,188

UNITED STATES PATENT OFFICE 2,134,188

HEATING AND COOLING SYSTEM FOR SELF PROPELLED VEHICLES

Carl Haywood, Indianapolis, Ind.

Application October 19, 1936, Serial No. 106,312
Renewed April 8, 1938

12 Claims. (Cl. 257—7)

This invention relates to a temperature changing system for supplying cooled or cold air, when desired, or hot or heated air, when desired, and for example, to the interior compartment of an automobile, the system being self contained.

The chief object of the invention is to provide a system which by selective connection, is capable of functioning, either as a heating system or cooling system.

The chief features of the invention consists in providing in an absorption type refrigerating system a by-pass whereby the same is adapted to function as a heating system, instead of functioning in a normal manner as a cooling system.

Other features of the invention will appear more fully hereinafter.

The full nature of the invention will be understood from the accompanying drawing and the following description and claims.

In the drawing, the figure diagrammatically illustrates the invention applied to an automobile, parts thereof being conventionally illustrated as well.

In the drawing, 10 indicates a portion of an internal combustion engine, having a fan 11 driven by a belt 12 in the usual manner. Said fan is positioned immediately rearward of that part of the engine cooling system portion known as the radiator 13, which is shown positioned in spaced relation to and behind the radiator guard or grill 14. The automobile also is shown provided with a hood structure 15, cowl 16 and a dash board 17. The engine 10 discharges to and through an exhaust pipe 18.

Associated with the exhaust pipe and deriving heat therefrom, is the generator 19 of the absorption system. The automobile also includes a battery 20 grounded as at 21 to the frame and having one line 22 leading therefrom to a switch 22, from which also leads a line 23 to a motor 24 driving a fan 25 mounted in juxtaposition to the dash and if desired, upon the same, and immediately behind a radiator 26 which, when used for cooling air, serves as the evaporator in the cooling system and which when used for heating air, serves as the heater of the system.

The various other electrical connections between the battery generator and ignition system of the engine have been intentionally omitted for clearness.

If desired, the fan motor 24 may be replaced with a suction or vacuum operable motor, such fan operation for moving air and for changing the temperature in the enclosed compartment of a self propelled vehicle being well known in the art as being the full equivalent of the electrically operated fan structure shown herein.

The absorption type system includes in the generator 19 the coils 19a, and a line 27 therefrom includes a T 28, the line being continued and discharging to an analyzer 29 which serves to trap out the moisture. The line 30 therefrom connects the analyzer to the rectifier 31. The rectifier is connected by line 32 to the condenser 33, the latter being connected by line 34 to the evaporator 26, such connection being controlled by a valve, indicated generally by the numeral 35, and to which reference will be had hereinafter.

The radiator or evaporator 26 is connected by line 36 to the absorber 37 and the absorber 37 discharges by a line 38 and line 39 to the pump 40. The pump 40 in turn discharges by line 41 to the generator. The pump 40 mounts a pulley 42 which engages the fan driving belt 12 and thus the pump is operable with and by the engine.

The absorption type system thus briefly described, also includes the weak liquor line by-pass, the same including the line 44 which is normally in open communication with the line 27 and connects line 27 to the absorber by line 45. Thus, the weak liquor which passes through lines 44 and 45 unites with the discharge from the radiator 26 through line 36 at the absorber 37 and is returned to the pump through lines 38 and 39.

The rectifier includes a portion 47 which is connected by line 48 to the weak liquor line 44—45 as at 49 which connection is between two temperature changing devices 50 and 51, respectively, therein. Included within the portion 51 is a coil, or equivalent device, 52, which has its ends connected to lines 38 and 39 as shown. The device 51 is included as a part of the weak liquor by-pass. The device 50 is also included as a part of the weak liquor line. The cooling medium is passed through the coils 53 of the device 51, being supplied by line 54 and discharging therefrom by line 55. Line 55 is associated with the absorber 37, as indicated at 56, and the discharge therefrom is connected by line 57 to the coil 58 associated with the rectifier 31. The discharge therefrom is conected by line 59 to a cooling coil or radiator 60, the discharge therefrom being connected to the line 54, all as diagrammatically shown herein.

A by-pass 61 has one end connected to the T 28 and has the other end connected to the valve 35.

The valve 35 is a three-way valve. In one position the entire system is completely closed. In another position the line 34 is prevented from discharging to the radiator 26 and simultaneously therewith line 61 discharges to the radiator 26. In another position, the valve 35 prevents line 61 from communicating with the radiator 26 and permits the line 34 to communicate with the radiator 26 and said communication may be regulated. When thus positioned, the valve 35 serves as an expansion valve in the cooling system.

To those familiar with the absorption type system of refrigeration, and to which this description is addressed, the various operations of the respective units diagrammatically illustrated herein, needs no additional description, except to point out that the inclusion of the by-pass 61 around the analyzer, rectifier and condenser of the absorption system, permits the system to serve as a heat supplying device—that is, to supply heat to the air passed through the radiator 26 by the fan instead of functioning as a cooling system for cooling air passed through the radiator 26 by the fan 25.

Certain of the devices, such as 50 and 51, may be utilized or omitted without departing from the broad feature of the invention, although their inclusion is preferred.

The cooling medium in the cooling system, which includes the pipe 57, coil 58, pipe 59, cooling coil or radiator 60, pipe 54, coil 53, pipe 55, coil 56, is preferably carbon tetrachloride. The inclusion of the by-pass arrangement 47, 48 and 49 is also optional in certain instances, although the inclusion of this portion of the system is preferred in the preferred form of the invention.

While the generator 19 is shown associated with the exhaust pipe 18, it may be associated with any other source of heat or the heated portion of the exhaust system of the engine.

While the invention has been illustrated and described as being associated with an automobile generally, the same is not entirely restricted thereto but such application or embodiment is to be considered as illustrative.

While the invention has been described in great detail as to the novel portions and more or less generally, as to the absorption type system and various modifications have been pointed out hereinbefore, all of the aforesaid is to be considered illustrative and not restrictive in character, and the said modifications as well as others which will readily suggest themselves to persons skilled in this art, all are considered to be within the broad scope of the invention, reference being had to the appended claims.

The invention claimed is:

1. In a motor vehicle heating and cooling system, the combination with an engine providing a source of heat and a source of power for a temperature changing system, of a temperature changing system of the absorption type including a heat changing radiator, means for moving air in juxtaposition thereto, the temperature of which is to be changed, a pump operable by the engine, an absorption type system including a cooling system, a generator, a rectifier, an absorber, and a condenser, the generator being associated with the source of heat, the generator, rectifier and condenser being connected in series, the condenser discharging to the radiator, the pump being connected to the absorber and the generator, and valve means in the absorption system, and a by-pass between the generator and radiator around the rectifier and condenser, said valve means selectively controlling the temperature changing medium in the temperature changing system to secure heating or cooling of the air as desired.

2. A system as defined by claim 1, characterized by the valve means comprising a three-way, expansion valve.

3. A system as defined by claim 1, characterized by the engine source of power including an engine driven belt, and said pump being juxtapositioned relative thereto and including belt engageable means for pump operation with and by engine operation.

4. A system as defined by claim 1, characterized by the temperature changing system including a weak liquor by-pass from the generator to the absorber and around the rectifier, condenser and radiator, and a connection from the weak liquor by-pass to the by-passed portion of the system between the rectifier and condenser.

5. A system as defined by claim 1, characterized by the temperature changing system including a weak liquor by-pass from the generator to the absorber and around the rectifier, condenser and radiator, the cooling system including a cooling portion or radiator for cooling the cooling medium therein and having other portions operatively associated with the rectifier and absorber.

6. A system as defined by claim 1, characterized by the temperature changing system including a weak liquor by-pass from the generator to the absorber and around the rectifier, condenser and radiator, the cooling system including a cooling portion or radiator for cooling the cooling medium therein and having other portions operatively associated with the rectifier, absorber and weak liquor by-pass.

7. A system as defined by claim 1, characterized by the temperature changing system including a weak liquor by-pass from the generator to the absorber and around the rectifier, condenser and radiator, the cooling system including a cooling portion or radiator for cooling the cooling medium therein and having other portions operatively associated with the rectifier and absorber, and means included between the absorber and pump and in the communication therebetween and operatively associated with a portion of the weak liquor by-pass.

8. A system as defined by claim 1, characterized by the temperature changing system including a weak liquor by-pass from the generator to the absorber and around the rectifier, condenser and radiator, the cooling system including a cooling portion or radiator for cooling the cooling medium therein and having other portions operatively associated with the rectifier, absorber and weak liquor by-pass, and means included between the absorber and pump and in the communication therebetween and operatively associated with a portion of the weak liquor by-pass.

9. A system as defined by claim 1, characterized by the temperature changing system including a weak liquor by-pass from the generator to the absorber and around the rectifier, condenser and radiator, and a connection from the weak liquor by-pass to the by-passed portion of the system between the rectifier and condenser, the cooling system including a cooling portion or radiator for cooling the cooling medium therein and having other portions operatively associated with the rectifier and absorber.

10. A system as defined by claim 1, characterized by the temperature changing system including a weak liquor by-pass from the generator to the absorber and around the rectifier, condenser and radiator, and a connection from the weak liquid by-pass to the by-passed portion of the system between the rectifier and condenser, the cooling system including a cooling portion or radiator for cooling the cooling medium therein and having other portions operatively associated with the rectifier, absorber and weak liquor by-pass.

11. A system as defined by claim 1, characterized by the temperature changing system including a weak liquor by-pass from the generator to the absorber and around the rectifier, condenser and radiator, a connection from the weak liquor by-pass to the by-passed portion of the system between the rectifier and condenser, the cooling system including a cooling portion or radiator for cooling the cooling medium therein and having other portions operatively associated with the rectifier and absorber, and means included between the absorber and pump and in the communication therebetween and operatively associated with a portion of the weak liquor by-pass.

12. A system as defined by claim 1, characterized by the temperature changing system including a weak liquor by-pass from the generator to the absorber and around the rectifier, condenser and radiator, a connection from the weak liquor by-pass to the by-passed portion of the system between the rectifier and condenser, the cooling system including a cooling portion or radiator for cooling the cooling medium therein and having other portions operatively associated with the rectifier, absorber and weak liquor by-pass, and means included between the absorber and pump and in the communication therebetween and operatively associated with a portion of the weak liquor by-pass.

CARL HAYWOOD.